United States Patent
Quaeck

(10) Patent No.: US 6,257,396 B1
(45) Date of Patent: Jul. 10, 2001

(54) SEALLESS, PARTICULATE IMPERVIOUS RECIPROCATING CONVEYOR

(76) Inventor: Manfred W. Quaeck, 1515 210th NE., Redmond, WA (US) 98053

( * ) Notice: Subject to any disclaimer, the term of this patent is extended or adjusted under 35 U.S.C. 154(b) by 0 days.

(21) Appl. No.: 09/100,333

(22) Filed: Apr. 7, 1998

Related U.S. Application Data

(63) Continuation-in-part of application No. 08/761,777, filed on Dec. 6, 1996.

(51) Int. Cl.$^7$ .................................................. B65G 25/00
(52) U.S. Cl. ......................................................... 198/750.3
(58) Field of Search .............................. 198/750.2, 750.3

(56) References Cited

U.S. PATENT DOCUMENTS

| | | | | |
|---|---|---|---|---|
| 5,165,525 | * | 11/1992 | Quaeck | 198/750.3 |
| 5,323,894 | * | 6/1994 | Quaeck | 198/750.3 |
| 5,346,056 | * | 9/1994 | Quaeck | 198/750.3 |
| 5,560,472 | * | 10/1996 | Gist | 198/750.3 |
| 5,850,905 | * | 12/1998 | Foster | 198/750.3 |
| 5,996,772 | * | 12/1999 | Foster | 198/750.3 |

* cited by examiner

Primary Examiner—James R. Bidwell
(74) Attorney, Agent, or Firm—Robert W. Jenny

(57) ABSTRACT

The load supporting and moving surface of the conveyor is made up of longitudinal members called slats. The slats are edge to edge with small gaps between the edges. The slats are supported on longitudinal bearing strips, one edge of each slat on one strip, the other on an adjacent strip. The bearing strips are supported on longitudinal beams, evenly spaced and running lengthwise of the cargo space of the conveyance in which the conveyor is mounted. The longitudinal beams are supported by and fastened individually to crossbeams of the conveyance. The bearing strips slide longitudinally onto the longitudinal beams and the slats slide longitudinally onto the bearing strips. Clearance is provided for fastening the longitudinal beams from above. The upper surfaces of the bearing strips have longitudinal grooves in the center of their upper surfaces. Flanged ribs on their lower surfaces engage the flanges of the longitudinal beams to hold the strips in place. The edges of the slats are over the grooves. Flanged ribs on the bottom surfaces of the slats engage the flanges on the longitudinal beams or, in some configurations, the edges of the bearing strips. The conveyor includes hydraulic/mechanical apparatus well known in the art for reciprocating the slats in prescribed ways to move loads along the conveyor.

5 Claims, 4 Drawing Sheets

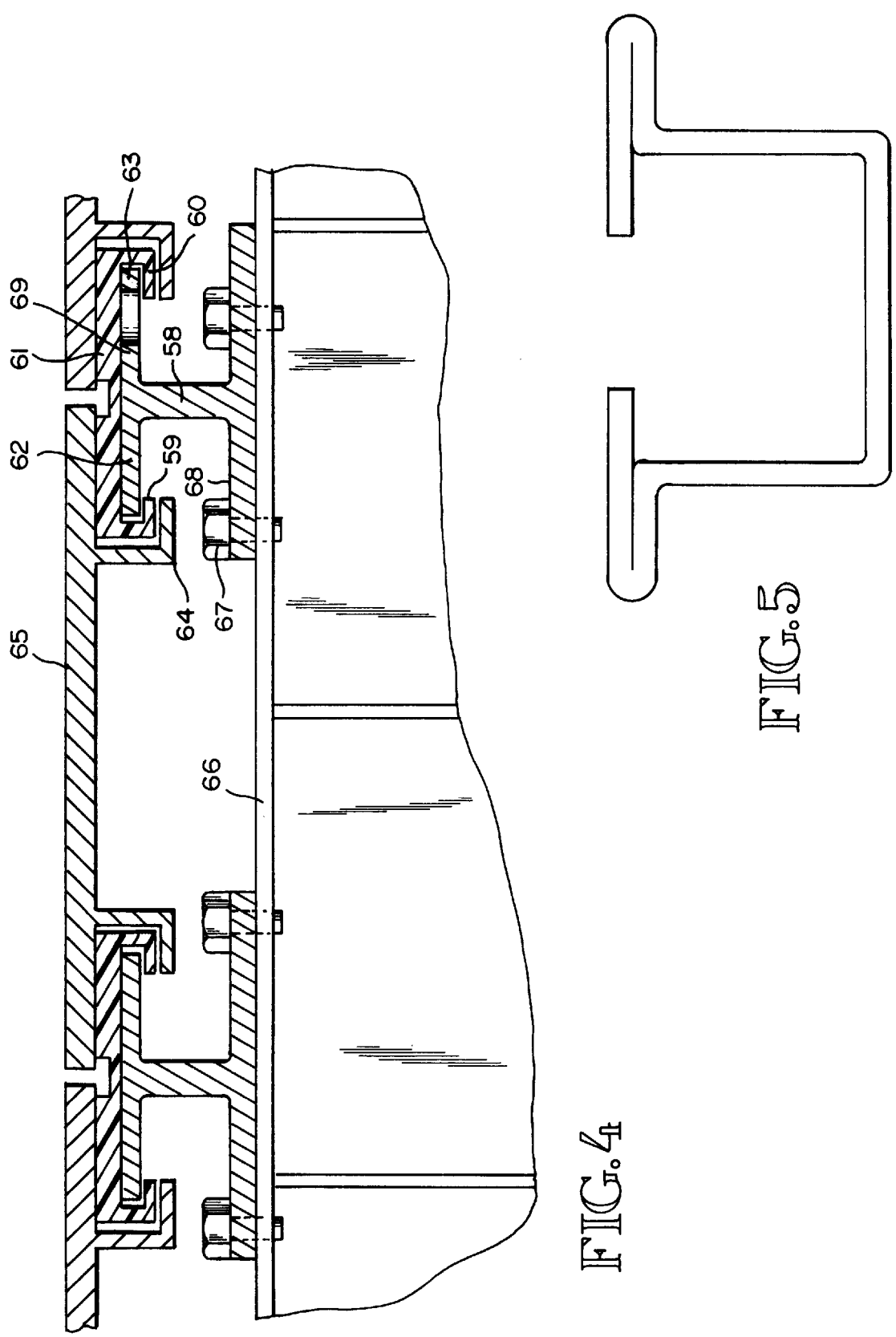

SEALLESS, PARTICULATE IMPERVIOUS RECIPROCATING CONVEYOR

This application is a Continuation-In-Part application based on U.S. application Ser. No. 08/761,777, filed Dec. 6,1996 and to be abandoned when this application is duly filed.

BACKGROUND OF THE INVENTION

1. FIELD

The subject invention is in the field of conveyors, specifically conveyors for use with bulk materials such as fertilizer, sawdust and grains and generally known as particulate materials. More specifically, it is in the field of particulate material conveyors usable on conveyances such as trucks and trailers and, still more specifically, such conveyors in which the material is supported on a floor comprised of longitudinal members called slats and the material is moved by longitudinal oscillation of groups of slats.

2. PRIOR ART

The U.S. patents listed below are a selection of prior art in this still more specific field.

| | | | | | |
|---|---|---|---|---|---|
| 4,679,686 | 7/1987 | Foster | 5,088,595 | 2/1992 | Hallstrom, Jr. |
| 4,749,075 | 6/1988 | Foster | 5,238,360 | 8/1993 | Foster |
| 4,785,929 | 11/1988 | Foster | 5,267,641 | 12/1993 | Hallstrom, Jr. |
| 4,856,645 | 8/1989 | Hallstrom, Jr. | 5,323,894 | 6/1994 | Quaeck |
| 4,858,748 | 8/1989 | Foster | 5,325,957 | 7/1994 | Wilkens |
| 4,896,761 | 1/1990 | Foster | 5,335,778 | 8/1994 | Wilkens |
| 4,940,132 | 7/1990 | Foster | 5,346,056 | 9/1994 | Quaeck |
| 4,984,679 | 1/1991 | Foster | 5,560,472 | 10/1996 | Gist |
| 5,064,052 | 11/1991 | Foster | | | |

The prior art conveyors suffer from wear and failure because they are relatively complex and incorporate various kinds of seals to prevent particulate material from migrating through the floor between the slats. The wear, failure and complexity all add to the costs of using these conveyors. For example, the Foster '686, '075 and '929 conveyors all use pluralities of bearings to support the slats, as many as 1300 in an average trailer installation. Installation of these bearings is done by hand and requires considerable man-hours. For another example, the seal strips used between slats in the conveyors of Foster '132, '679 and '052 are known to require replacement which is costly because of the repair costs and the downtime required for the repairs. Such seals also introduce an extra component of friction into the operation of the conveyors, further adding to the cost of operation.

In Hallstrom, Jr., '645 and '595, there are no seals between the edges of the slats and particles collect in channels below the slats. Seals are used to prevent these particles from migrating into the bearings supporting the slats. The accumulation of these particles can be troublesome.

Quaeck (the inventor of the subject invention), in his patents '894 and '056, shows reciprocating conveyors with no seals between the slats and having a liquid tight base structure. Particles which fall between the slats accumulate in grooves, do no harm and can be flushed out during cleaning of the conveyor. The expense of a liquid tight base is rarely justifiable. Also, in Quaeck '894 the beams on which the bearing strips and slats of the reciprocating floor are extrusions with each extrusion comprising multiple beams or beam parts. This construction involves so-called "dead weight" of material between the beams and beam parts. This extra weight increases the costs of manufacturing and using the floor.

In the "walking floors" of Gist '472, the slats have flanges at each of their edges and the flanges serve as both bearings and seals, called bearing/seals. This construction requires use of a guide rail for each slat, with associated fasteners and results in relatively low bearing areas. Since some particulate matter is abrasive, the flanges and/or bearing material tend to wear and the wear tends to be uneven, further decreasing effective bearing area and sealing capability. The flanges (called ears in Gist) are more likely to wear than the high molecular weight bearing material and repair might require replacement of the slats having worn flanges.

In view of the prior art, the primary objective of the subject invention is to provide a reciprocating conveyor which has no seals but is impervious to particulate matter. A second important objective is that the conveyor be mechanically and structurally simple compared to related prior art. Related objectives are that (1) the floor be simple to install with all fastening done from above floor level and (2) the number of components (parts count) be relatively low. Another objective is that the structure involve a minimum of dead weight.

SUMMARY OF THE INVENTION

The subject invention is a reciprocating conveyor for use in various conveyances including trucks and trailers for supporting and unloading loads of particulate materials such as grains, sawdust, fertilizer and the like. The conveyor comprises a plurality of slats installed edge to edge lengthwise of the conveyor. It is well known in the art that loads are moved on such conveyors by reciprocating the slats in a particular sequence. When the slats are moved simultaneously in one direction the load moves in that direction. The slats are then retracted in groups, such as three groups, to the starting position and the load does not move in the retraction direction.

The various conveyances in which reciprocating conveyors are installed have what is termed a bed on which the conveyor is supported and the bed comprises a plurality of cross beams extending the width of the conveyor, installed perpendicular to the length of the conveyance and conveyor and preferably evenly spaced over the length. The conveyor comprises a plurality of longitudinal beams, a plurality of bearing strips, a plurality of slats and fasteners (or welding) for attaching the longitudinal beams to the cross beams. The longitudinal beams each extend the length of the conveyor but need not be all one piece. They are evenly spaced across the cross beams with the bottoms of the longitudinal beams down and in contact with the crossbeams. They can be fastened to the crossbeams by welding if material selections permit or by threaded fasteners installed in holes in the bottoms of the beams and threaded into threaded holes in the crossbeams. There may be fastening at each intersection of crossbeam and longitudinal beam but fewer fastenings may be used if design conditions allow. The longitudinal beams are parallel to each other, and flanged at their upper edges, the flanges being parallel to the cross beam upper surfaces, i.e. horizontal. The longitudinal beams are configured to provide access of fastening tools to the fasteners if fasteners are used to fasten the longitudinal beams to the cross beams.

A bearing strip is installed on each longitudinal beam. These strips are preferably plastic and at least as wide as the distance between the outer edges of the flanges of the longitudinal beams. The upper surface of each bearing strip has a longitudinal groove along its center. Flanged, longitudinal ribs on the bottom surface of each bearing strip engage the flanges on a longitudinal beam to prevent the bearing strips from lifting off of the longitudinal beams. In an alternate embodiment the bearing strips extend around the outer edges of the flanges of the longitudinal beams. The bearing strips are moved longitudinally onto the longitudinal beams.

The slats reciprocate longitudinally, supported on the bearing strips. Flanged ribs on the lower surfaces of the slats engage the edges of the bearing strips or flanges of the channel beams, depending on the embodiment of the invention, to prevent the slats from lifting off of the bearing strips. In one embodiment of the invention there are flanges extending downward from the lower surface of each slat at the edges of the slat. The width of the slats is such that these flanges fit into the grooves in the upper surfaces of the bearing strips and engagement of the ribs with the sides of the grooves provides lateral restraint of the slats. In an alternate embodiment there are no flanges at the edges of the slats and lateral restraint of the slats is provided by engagement of the flanged ribs on the lower side of the slats with edges of the bearing strips.

Mechanism well known in the art is used to move the slats in unison in one direction to move a load in that direction and to move the slats in groups in the other direction to reset them for another move in unison.

The invention is described in more detail below with reference to the attached drawings.

BRIEF DESCRIPTION OF THE DRAWINGS

FIG. 4 illustrates an embodiment in which the longitudinal beams are I-beams.

FIG. 5 is a section of a longitudinal beam in the form of a channel made by roll forming rather than by the extrusion process.

DETAILED DESCRIPTION OF THE INVENTION

Figure 1:
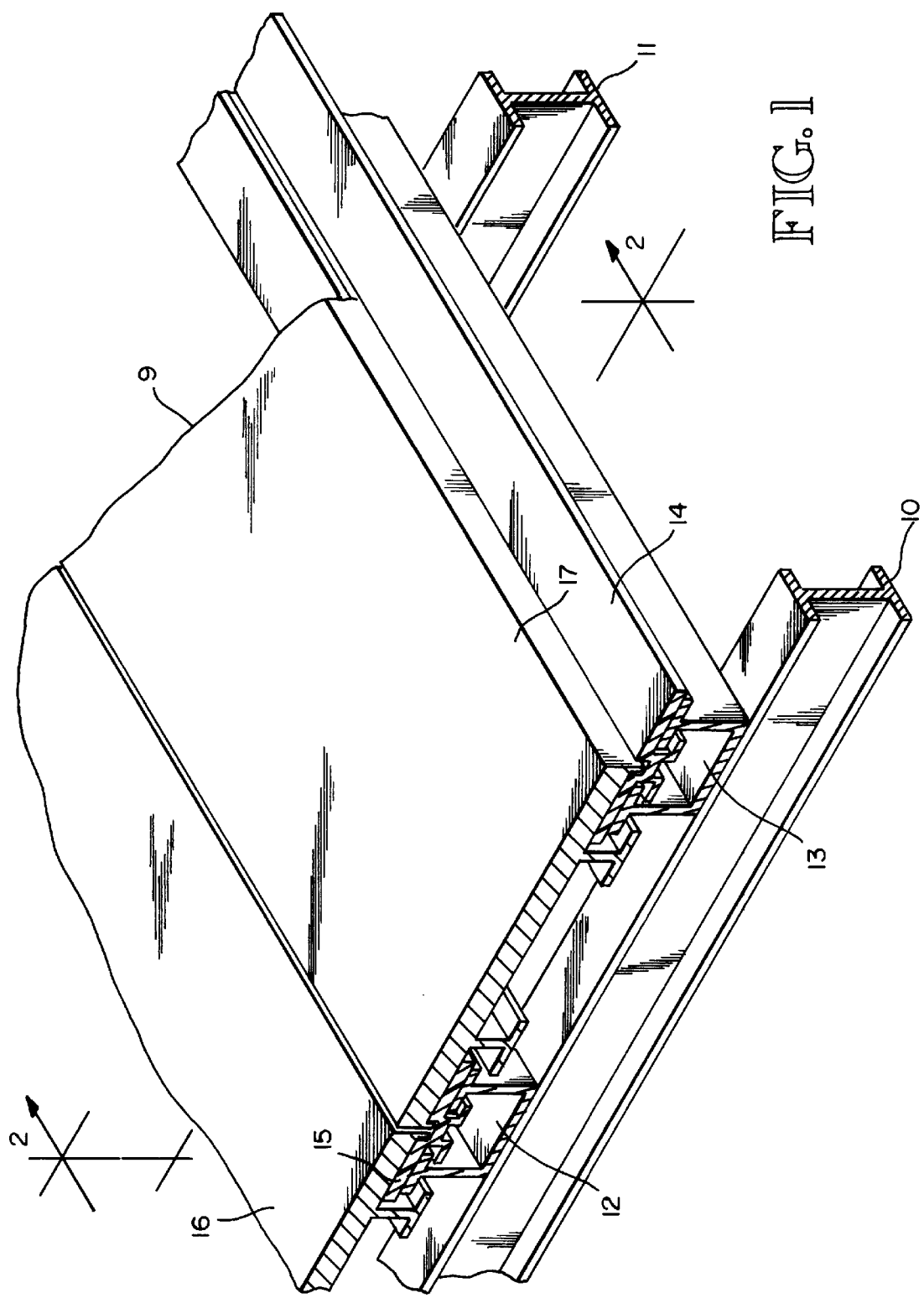
FIG. 1 is a sectional and cutaway view of a portion of the subject conveyor.

The subject invention is a reciprocating conveyor which has no seals and is impervious to particulate matter. FIG. 1 is a sectioned and cutaway view of a portion of the subject conveyor. Conveyor 9 is mounted on crossbeams, beams 10 and 11 being typical. These beams are part of the structure of the conveyance in which the conveyor is installed. The conveyor comprises longitudinal beams, beams 12 and 13 being typical, bearing strips, strips 14 and 15 being typical, and slats, slats 16 and 17 being typical. The bearing strips slide longitudinally onto the longitudinal beams and the slats slide longitudinally onto the bearing strips and, in some embodiments, the longitudinal beams.

Figure 2:
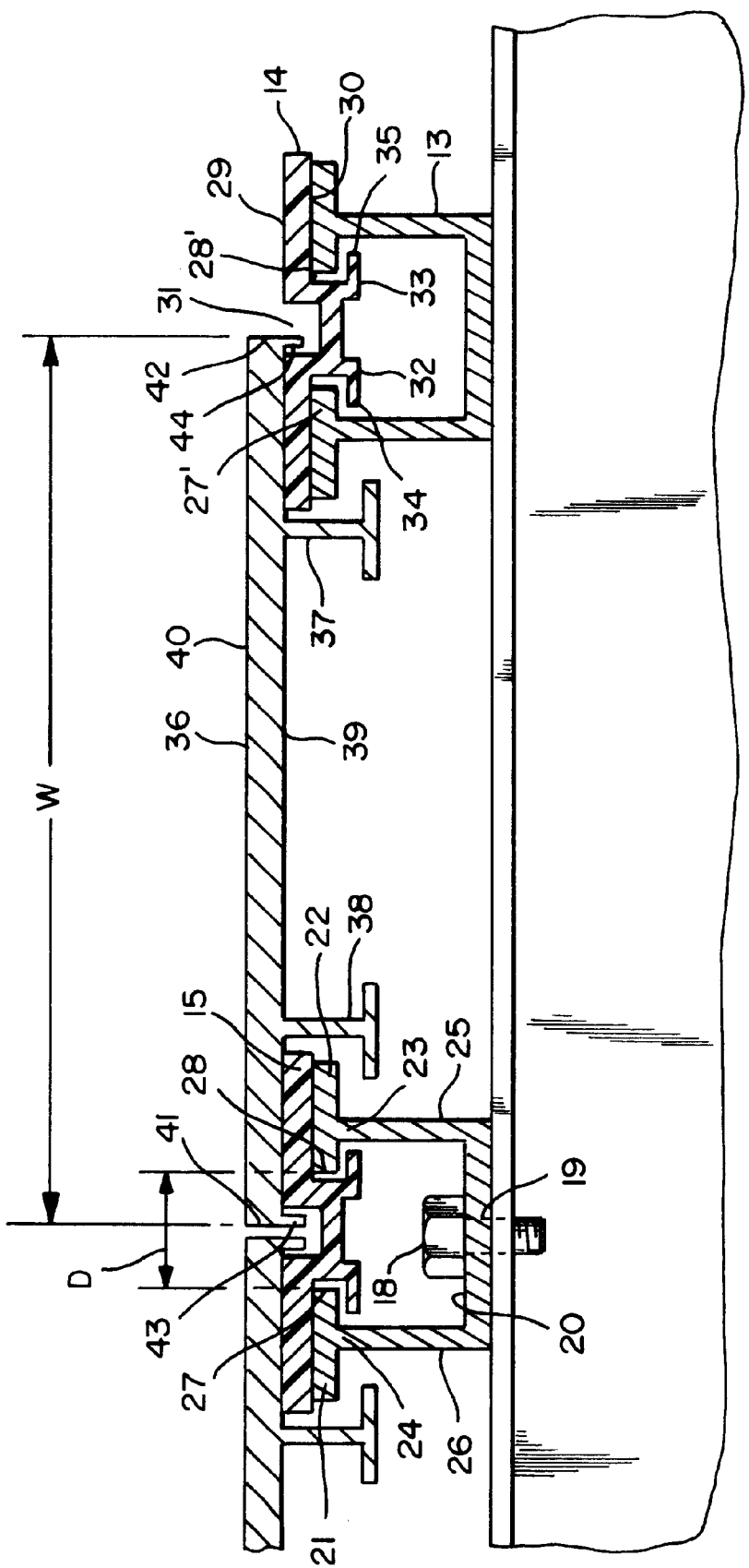
FIG. 2 is a section taken at 2—2 in FIG. 1.

FIG. 2 is a sectional view taken at 2—2 in FIG. 1. The longitudinal beams are channels fastened to the cross beams by fasteners, fastener 18 being typical, installed through holes, hole 19 being typical, in bottom 20 of beam 12. Beam flanges 21 and 22 on edges 23 and 24 of sides 25 and 26 at the top of the beam extend inward toward each other and outward from the sides. In other configurations the flanges extend either toward each other or away from each other. Distance D between edges 27 and 28 of the portion of the flanges extending toward each other is sufficient to allow access of conventional fastening tools to the fasteners. Alternately, the channel beams may be fastened to the cross beams by welding. All fastening is done from above the cross beams and longitudinal beams.

Bearing strips, preferably made of plastic, slide longitudinally onto the longitudinal beams, strips 15 and 14 on beams 12 and 13 respectively being typical and completely enclose the interior of the channels. As illustrated by strip 14, each bearing strip has a bearing side 29 and an attachment side 30 and there is a longitudinal groove 31 in the center of the bearing side. Flanged ribs 32 and 33 extend from the attachment side with flanges 34 and 35 engaging flanges 27' and 28' of the channel beam to prevent the strip(s) from being lifted off the channel beam(s).

Each slat, slat 36 being typical, is supported on two adjacent bearing strips and longitudinal beams. Ribbed flanges 37 and 38 extend from the slat bearing side 39 of the slat and loosely engage a bearing strip and longitudinal beam flange to prevent the slat from being lifted off the bearing strip(s) and longitudinal beam which supports it. Side 40 of the slat is termed the load bearing side. Width W of each slat is such that its edges 41 and 42 each extend over the longitudinal grooves in the bearing strips. In the embodiment illustrated there are flanges 43 and 44 extending from edges 41 and 42, respectively, into the grooves of the bearing strips. These flanges may cooperate with the walls of the groove for lateral guidance of the slats. In other embodiments of the invention there are no flanges at the slat edges. In those embodiments lateral guidance is provided by the flanged ribs on the slats and the adjacent edges of bearing strips.

As is well known in the art, a load supported on the load bearing sides of the slats can be moved by appropriate reciprocation of the slats.

Figure 3:
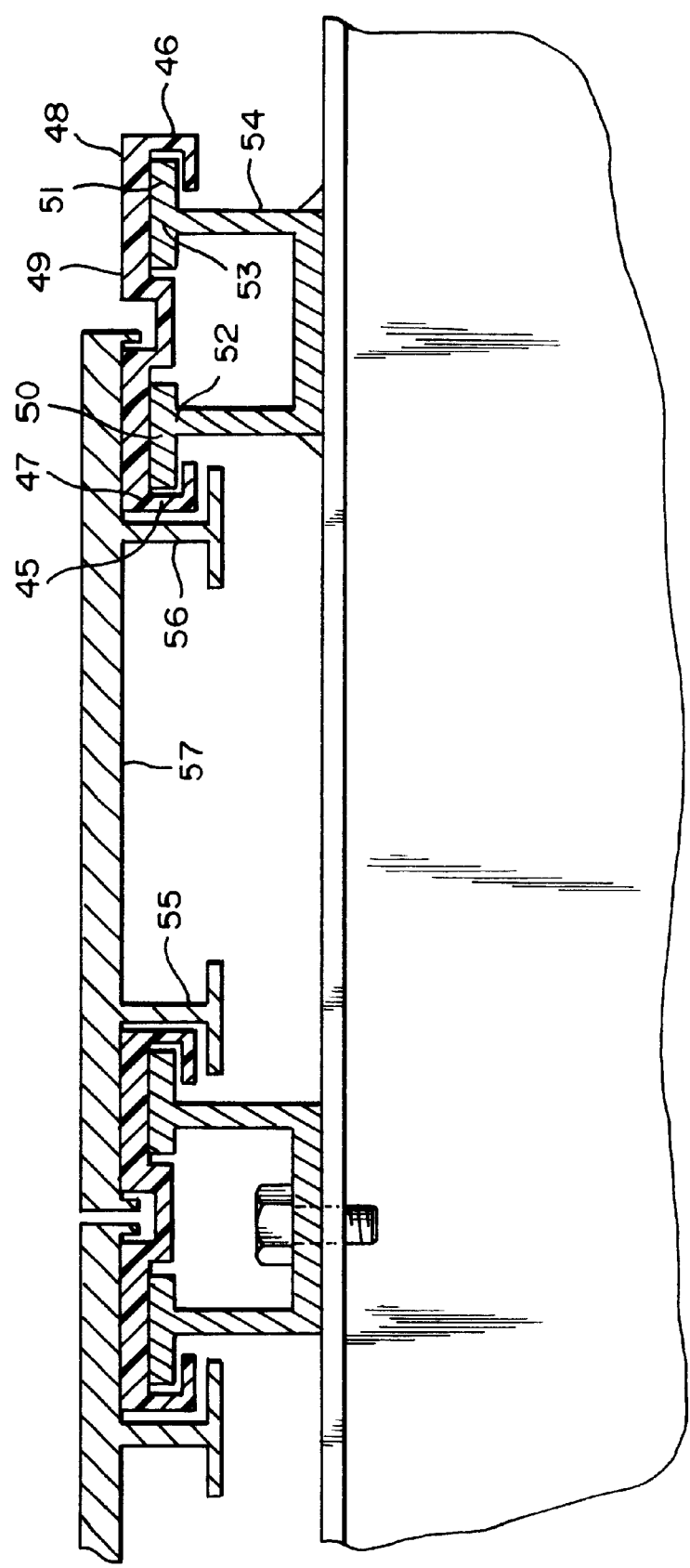
FIG. 3 is similar to FIG. 2 but illustrates an alternate configuration of the bearing strip.

FIG. 3 is similar to FIG. 2 but illustrates an alternate embodiment. In this embodiment the flanged ribs on the bearing strips, ribs 45 and 46 being typical, extend from edges 47 and 48, respectively of bearing strip 49 and engage the outward extending portions 50 and 51 of beam flanges 52 and 53 of longitudinal beam 54. The flanged ribs 55 and 56 of slat 57 engage the edges of the bearing strip. In this embodiment flange portions 27' and 28' (FIG. 2) may be eliminated, in which case flange portions 21 and 22 become flanges 50 and 51. For purposes of this disclosure the terms "flange" and "flange portions" are equivalent.

In the embodiments described above the longitudinal beams are in the form of flanged channels. In the embodiment shown in FIG. 4 the longitudinal beams are I-beams, beam 58 being typical. Flanges 59 and 60 on bearing strip 61 engage beam flanges 62 and 63 respectively at the top of the beam. Flanges, flange 64 being typical, on the slats, slat 65 being typical, retain the slats on the beams and bearing strips with longitudinal freedom of motion. The I-beams are attached at their bottoms to the crossbeams, cross beam 66 being typical, by welding or fasteners, fastener 67 being typical. To provide clearance for tools for inserting the fasteners, beam attachment flanges, flange 68 being typical, extend beyond the bearing strip flanges such as flange 62 or there may be holes in the bearing strip flanges, hole 69 being typical, to provide the access.

In the embodiments described above the longitudinal beams in the form of channels have cross section shapes characteristic of parts made by the extrusion process. FIG. 5 illustrates a channel beam equivalent to those shown in FIGS. 2 and 3 but made by roll forming.

In all embodiments of the subject invention particulate material which filters between the edges of the adjoining slats falls into the grooves in the bearing strips and is cleared away during the conveying process and/or routine maintenance.

It is considered to be understandable from the above descriptions that the subject invention meets its objectives. It provides a reciprocating conveyor which has no seals but is impervious to particulate matter. The conveyor is mechanically and structurally simpler and accordingly less expensive than known equivalent reciprocating conveyors. It is simple to install, since the only fasteners required are those used to fasten the longitudinal beams to the cross beams and those fasteners are installable from above the longitudinal beams. Also, there are only three parts per slat. Also, because the longitudinal beams are individually attached to the cross beams, dead weight is minimized.

It is also considered to be understood from this description that while certain embodiments of the subject invention are described herein, other embodiments and modifications of those described are possible within the scope of the invention which is limited only by the attached claims.

I claim:

1. In a reciprocating slat conveyor composed of side-by-side conveyor slats, each having laterally outwardly extending opposite upper side portions, each including a longitudinal support that contacts and slides along a longitudinal bearing surface on a longitudinal support beam that is below it, a conveyor structure comprising:

a longitudinal support beam positioned between each adjoining pair of conveyor slats, below adjacent upper side portions of the adjoining conveyor slats;

a longitudinal bearing member on each said support beam, extending along and secured to said support beam; and a longitudinal tongue-and-groove connection between said support beam and said bearing member comprising longitudinal tongues on one of said support beams and bearing member and longitudinal grooves on the other;

wherein the support beam has a top portion composed of a pair of confronting, laterally inwardly directing flanges defining a longitudinal opening between them, and said longitudinal bearing member having opposite side slots in which the flanges are received, an upper portion that is above the flanges and a lower portion that is below the flanges, and said flanges providing the tongue portions and the slots forming the groove portions of the tongue-and-groove connection.

2. In a reciprocating slat conveyor composed of side-by-side conveyor slats, each having laterally outwardly extending opposite upper side portions, each said side portion including a longitudinal support that contacts and slides along a longitudinal bearing surface on a longitudinal support beam that is below it, a conveyor structure comprising:

a longitudinal support beam positioned between each adjoining pair of conveyor slats, below adjacent upper side portions of the adjoining conveyor slats;

a longitudinal bearing member on each said support beams, extending along and secured to said support beam;

said longitudinal support beam having a bottom wall and a pair of side walls connected to and extending upwardly from said bottom wall to a top opening;

each said support beam including a pair of laterally outwardly directed flanges, one extending laterally outwardly from each side wall adjacent the top opening;

each longitudinal bearing member including laterally directed slots which receive the flanges on its support beam; and wherein said flanges provide tongue portions and the slots provide groove portions of tongue-and-grooye connections between said support beam and said bearing member.

3. A conveyor structure according to claim 1, further comprising a support member below said support beam, on which said support beam rests, and a fastener connecting said support beam to said support member, said fastener extending through the bottom wall of the support beam.

4. A conveyor structure according to claim 1, wherein said fastener has an enlarged upper end portion that bears downwardly against the bottom wall of the support beam.

5. A conveyor structure according to claim 4, wherein the fastener is a type that can be installed from above the support beam.

* * * * *